United States Patent [19]
Leowald et al.

[11] Patent Number: 5,489,838
[45] Date of Patent: Feb. 6, 1996

[54] METHOD AND APPARATUS FOR GENERATING A SYNCHRONIZING SIGNAL FOR A CONTROLLED SERIES COMPENSATOR

[75] Inventors: Karl-Friedrich Leowald, Uttenreuth-Weiher; Stephan Weiss, Mergentheim, both of Germany

[73] Assignee: Siemens Aktiengesellschaft, Munich, Germany

[21] Appl. No.: 61,972

[22] Filed: May 17, 1993

[30] Foreign Application Priority Data

May 18, 1992 [EP] European Pat. Off. ............ 92108334

[51] Int. Cl.⁶ ..................................... G05F 1/70
[52] U.S. Cl. ............................ 323/210; 323/209
[58] Field of Search .................... 323/208, 209, 323/210, 211

[56] References Cited

U.S. PATENT DOCUMENTS

| | | | |
|---|---|---|---|
| 4,292,545 | 9/1981 | Hingorani | 323/210 |
| 4,859,884 | 8/1989 | Yoshino | 323/210 |
| 4,999,565 | 3/1991 | Nilsson | 323/210 |
| 5,032,738 | 7/1991 | Vithayathil | 323/211 |
| 5,134,356 | 7/1992 | El-Sharkawi et al. | 323/211 |
| 5,198,746 | 3/1993 | Gyugi et al. | 323/207 |
| 5,202,583 | 4/1993 | Larsen et al. | 323/211 |
| 5,227,713 | 7/1993 | Bowler et al. | 323/210 |
| 5,291,120 | 3/1994 | Leowald et al. | 323/209 |
| 5,367,197 | 11/1994 | Klerfors | 323/211 |
| 5,374,853 | 12/1994 | Larsen et al. | 323/211 |
| 5,424,627 | 6/1995 | Clark et al. | 323/210 |

FOREIGN PATENT DOCUMENTS

| | | | |
|---|---|---|---|
| 0298515 | 1/1989 | European Pat. Off. | H02J 3/18 |
| 0442455 | 8/1991 | European Pat. Off. | H02J 3/24 |
| WO8704538 | 7/1987 | WIPO | G05F 1/70 |

OTHER PUBLICATIONS

IEEE Transactions on Power Delivery, vol. 7, No. 2 Apr. 1992, New York, US, pp. 914–919; Boon–Teck OOI et al.: *Solid–State Series Capacitive Reactance Compensators.*

Siemens Forsch. U. Entwicklungsbericht, vol. 6 (Jun. 1977) No. 1, pp. 29–38, W. Meusel and H. Waldmann: *Coordinate Transformations of Multi–Term Regulation Systems for the Compensation and Symmetrization of Three–Phase Supplies.*

IEE Meeting, London, UK, N. Christl et al.: *Power System Studies and Modelling for the Kayenta 23;0 KV Substation Advanced Series Compensation,* pp. 33–37, Dec. 1991.

Cigre Tagung, Summer 1992, N. Christl et al.: *Advanced Series Compensation (ASC) with Thyristor Controlled Impedance,* pp. 1–10, Sep. 1992.

EPRI Workshop, Nov. 14–16, Dec. 1990, Cincinnnati, Ohio, Siemens, Munich, Germany: *Advanced Series Compensation with Variable Impedance,* 13 pages.

*Primary Examiner*—Jeffrey L. Sterrett
*Attorney, Agent, or Firm*—Kenyon & Kenyon

[57] ABSTRACT

A method and apparatus is described for generating a synchronizing signal for a firing-circuit subassembly to trigger a power converter valve of a controlled series compensator. According to the invention, a sinusoidal substitute variable is provided, which can be either a measured line current or the sum of a capacitor current and a valve current, such that the zero crossings of said substitute variable do not vary. This substitute variable is modified in terms of its phase position so that a synchronizing signal that corresponds to the phase position of the capacitor voltage of the series capacitor of the controlled series compensator is made available to the firing-circuit subassembly. The result, even in the bypassed state, is a sinusoidal synchronizing signal whose zero crossings do not vary, so that operating stability problems no longer occur in the transient state during operation close to resonance.

14 Claims, 4 Drawing Sheets

METHOD AND APPARATUS FOR GENERATING A SYNCHRONIZING SIGNAL FOR A CONTROLLED SERIES COMPENSATOR

BACKGROUND OF THE INVENTION

The present invention relates to a method and apparatus for generating a synchronizing signal for a firing-circuit subassembly to trigger a power converter valve of a controlled series compensator.

In series compensation, capacitors are usually used in the line section in order to gradually reduce the transmission phase angle and the current-related voltage drop on the line. These capacitors are capacitor banks that are connected to and disconnected from the system either as a group or as a plurality of subcapacitors (segments) in series. The capacitor is connected and disconnected by opening or closing a parallel circuit breaker. Protection for the capacitor, in the event of a network short circuit, is provided by a parallel shunt, a triggerable spark gap, and/or a parallel circuit breaker.

Also in a series compensation system, the total impedance of the series compensator (by analogy with the TCR [thyristor controlled reactor] in a static compensator) is steplessly controlled by means of an inductor wired in parallel with the capacitor with a power converter valve at high voltage by firing in an appropriate manner. A series compensator controlled in this manner is known as an ASC (advanced series compensator). With a series compensator controlled in this manner, the dynamics of series compensation can be improved and the total impedance can be controlled within a certain range. The impedance can also be changed from capacitative to inductive.

Series compensators of this kind are described in the article "Regulated Parallel and Series Compensators," printed in the German journal "Elektrie," volume 45, March 1991, pages 88–90. A series compensator of this type, that is integrated into a transmission line, is also described in the international patent document WO 87/04538.

The operation of the controlled series compensation system is based on the triggering of a power converter valve that generates, by means of a specific charge-reversal process through the coil, an impedance affecting the power network. This triggering must repeat periodically, and is related to the voltage through the capacitor of the controlled series compensation system. A firing-circuit subassembly ensures time-synchronized triggering of this power converter valve. This firing-circuit subassembly emits firing pulses that are determined from a synchronizing signal and a specific delay angle related thereto. A downstream logic unit also allows protective intervention to block firing in the event of malfunctions.

Each zero crossing of the synchronizing voltage generates the starting point of a ramp. The intersection points between the ramp and a straight line reproducing the delay angle define the valve triggering times for the positive and negative half-waves of the capacitor voltage. The downstream barrier logic unit makes it possible to block firing pulses for protective or startup purposes. A preparation circuit followed by signal amplifiers adapts the signals and their pulse lengths to the requirements of the valve electronics. The capacitor voltage of the controlled series compensator is used as the synchronizing voltage.

Since, in the ideal operating mode, the capacitor voltage is a non-sinusoidal variable with zero crossings that change in the course of the charge-reversal process, this variable is not suitable for stable synchronization of the firing-circuit subassembly. There is also the danger of a zero crossing shift due to superimposition of a DC voltage component on the capacitor voltage. If the capacitor voltage, with its changing zero crossings, is used as the synchronizing signal, stability problems will occur in the transient state when the controlled series compensator is being operated close to resonance. When the controlled series compensator is bypassed, the series capacitor is short-circuited, meaning that no further voltage is present at the capacitor. Therefore, in the bypassed state no synchronizing signal for the firing-circuit subassembly is present.

An underlying object of the present invention is to provide a method and an apparatus for generating a synchronizing signal for a firing-circuit subassembly to trigger a power converter valve of a controlled series compensator, without the aforementioned disadvantages.

SUMMARY OF THE INVENTION

This and other objects are met by the method and apparatus of the present invention.

The firing-circuit subassembly of the controlled series compensator requires a synchronizing signal in order to trigger the power converter valve of the controlled series compensator when the capacitor voltage is at a defined phase position. The invention is based on the recognition that if the capacitor voltage can lead to operating stability problems as a result of the aforesaid disadvantages, a substitute variable is used and is further processed to produce a signal synchronous with the capacitor voltage. According to the invention, the substitute variable used is either the line current or the sum of the capacitor current and valve current. The phase position of this signal is modified by a servo synchronizer so that the firing-circuit subassembly is supplied with a signal that corresponds to the phase position of the capacitor voltage.

In the method of the present invention, the substitute variable is first stripped of disturbance variables, for example second and third harmonics, which also produces a phase shift. The advantage of this method is that disturbance value suppression and phase correction can be influenced by two steps in the method, essentially separately from one another.

In an apparatus for implementing the method according to the invention for generating a synchronizing signal, the apparatus comprises a filter sequence and a servo synchronizer. The filter sequence comprises one digital and one analog filter that are adapted to the line frequency by means of a frequency adaptation device. The servo synchronizer performs amplitude scaling by means of an amplitude adaptation device as a function of the determined amplitude of the line current, since the dynamics depend on amplitude.

In a further apparatus of the present invention, the digital filters of the filter sequence, the frequency adaptation device, and the amplitude adaptation device are implemented by means of a digital signal processor. In addition, the servo synchronizer is implemented by means of a digital signal processor.

DETAILED DESCRIPTION

Figure 1:
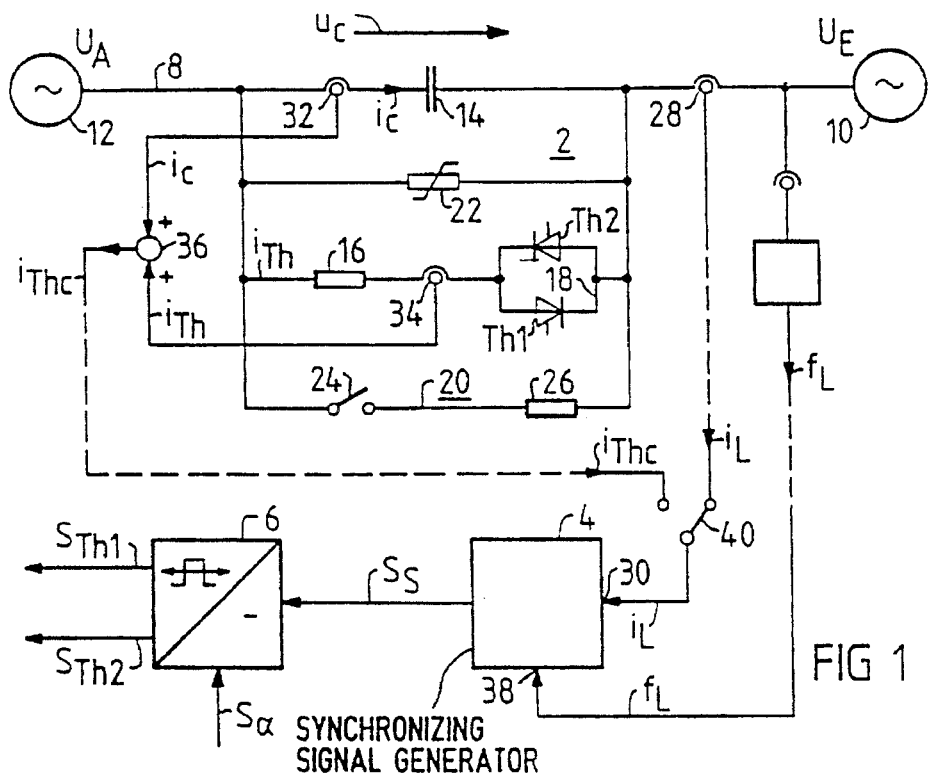
FIG. 1 is a controlled series compensator having an apparatus for generating a synchronizing signal with a downstream firing-circuit subassembly.

Referring to FIG. 1, an equivalent circuit diagram is shown of a controlled series compensator 2 with synchronizing signal generator 4 for generating synchronizing signal $S_S$ that is transferred to a downstream firing-circuit subassembly 6. A block diagram of the synchronizing signal generator 4 is shown in greater detail in FIG. 6, and FIGS. 7 and 8 each depict elements of the synchronizing signal generator 4 in greater detail. Firing-circuit subassembly 6 ensures time-synchronized triggering of two thyristors Th1 and Th2. The firing-circuit subassembly 6 emits firing pulses $S_{Th1}$ and $S_{Th2}$ for the two thyristors Th1, Th2 that are determined from the synchronizing signal $S_s$ and a selected delay angle $S_\alpha$ related thereto. Controlled series compensator 2, which is also known as an ASC (advanced series compensator), is integrated as a series resistor into a transmission line 8. This is done in most cases in the middle of line 8, but can also occur at the output or input from or to switching substations. Indicated at the beginning and end of the line are voltage sources 10 and 12, respectively, whose voltages $U_E$ and $U_A$ differ in amplitude by a line voltage drop $\alpha$ U, and are phase-shifted by a voltage torsion angle θ. Voltage $U_A$ at the beginning of the line is also referred to as transmitting voltage $U_A$, and voltage $U_E$ at the end of the line is also referred to as load voltage $U_E$.

The configuration of a controlled series compensation system 2 can be divided into three sectors. The core of such a system 2 comprises a capacitor 14 that is serially integrated into transmission line 8. This allows compensation for the inductive longitudinal impedance of line 8, which is responsible for the inductive reactive power component. Also present, in parallel, in the controlled series compensation system 2 is a branch comprising a coil 16 and a power converter valve 18. The power converter valve 18 as depicted is a parallel circuit including two thyristors Th1 and Th2, arranged antiparallel to one another. These two thyristors Th1 and Th2 allow coil 16 to be switched on at predetermined times. Other semiconductor valves, for example GTO (gate turn-off) thyristors, can also be used instead of thyristors Th1 and Th2. With this branch, it is possible to modify the effective impedance of the controlled series compensator 2 continuously between capacitative and inductive by means of a phase-angle system. This makes it possible not only to increase transmission performance, but also to limit any short-circuit current on line 8 in the event of a fault. The advantages of the use of series capacitors are enumerated in the textbook entitled "Series Capacitors in Electrical Power Networks" by Dr.-Ing. Leonhard Müller, 1967, page 4, and also applies to a controlled series compensator 2.

To protect capacitor 14, coil 16, and power converter valve 18 from overloads caused by excessive line currents $i_L$, a bypass 20 and a nonlinear resistor 22, also called an arrester, are installed parallel to elements 14 or 16 and 18. A metal oxide varistor (MOV) can, for example, be provided as the nonlinear resistor 22. This metal oxide varistor 22, installed electrically parallel to the series capacitor 14, is dimensioned so that at a predetermined voltage amplitude, the arrester 22 very quickly conducts current and thus protects the series capacitor 14 from long-duration overload conditions. The energy absorption capacity of a nonlinear resistor 22 is of course limited by economic considerations, and the series compensation system 2 therefore also needs the ability to protect the series capacitor 14, with its arrester 22, from overloads. This is performed by parallel bypass 20, which comprises a bypass switch 24 and a damping circuit 26. Bypass switch 24 closes as soon as the load capacity, i.e. the energy absorption capacity, of arrester 22 has been exceeded.

A device 28 determines the actual value of line current $i_L$ and transfers it to an amplitude input 30 of the synchronizing signal generator 4. The actual value of capacitor current $i_c$ is determined by means of a device 32, and the actual value of the valve current $i_{Th}$ is determined by means of a device 34, and sent to a logic element 36, the output of which can also be supplied to the amplitude input 30 of the synchronizing signal generator 4. An actual value for the frequency $f_L$ of transmission line 8 is transferred to a frequency input of the synchronizing signal generator 4. The system variables $i_L$, $i_{Thc}$, and $f_L$ are transferred in a voltage-free manner by means of a fiber optic system from system 2 (which is at high voltage) to the synchronizing signal generator 4 for generating a synchronizing signal $S_S$ (which is at ground potential). This voltage-free transmission of system variables $i_L$, $f_L$, and $i_{Thc}$ is depicted by a dashed line.

Figure 2:
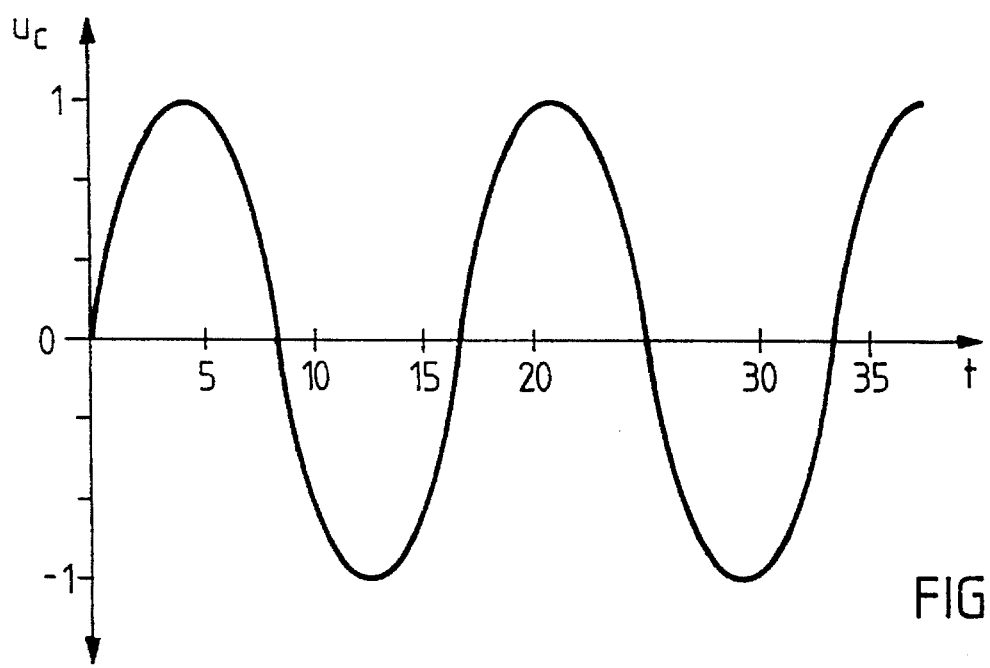
FIG. 2 is a graph of capacitor voltage plotted as a function of time t.

Referring to FIG. 2, a graph plotted against time t is shown of the change in capacitor voltage $u_c$ as is present across capacitor 14 of the controlled series compensator 2 of FIG. 1. It is evident from this graph that the capacitor voltage $u_c$ is a non-sinusoidal variable that has varying zero crossings (charge reversal). As already mentioned, this results in operating stability problems, since the firing-circuit subassembly can no longer provide time-synchronized triggering of valves Th1 and Th2. The zero crossings of the capacitor voltage $u_c$ or of the synchronizing voltage are used to generate the starting points of a ramp that, together with a line that can reproduce the delay angle, yields intersection points that become the valve triggering times.

Figure 3:
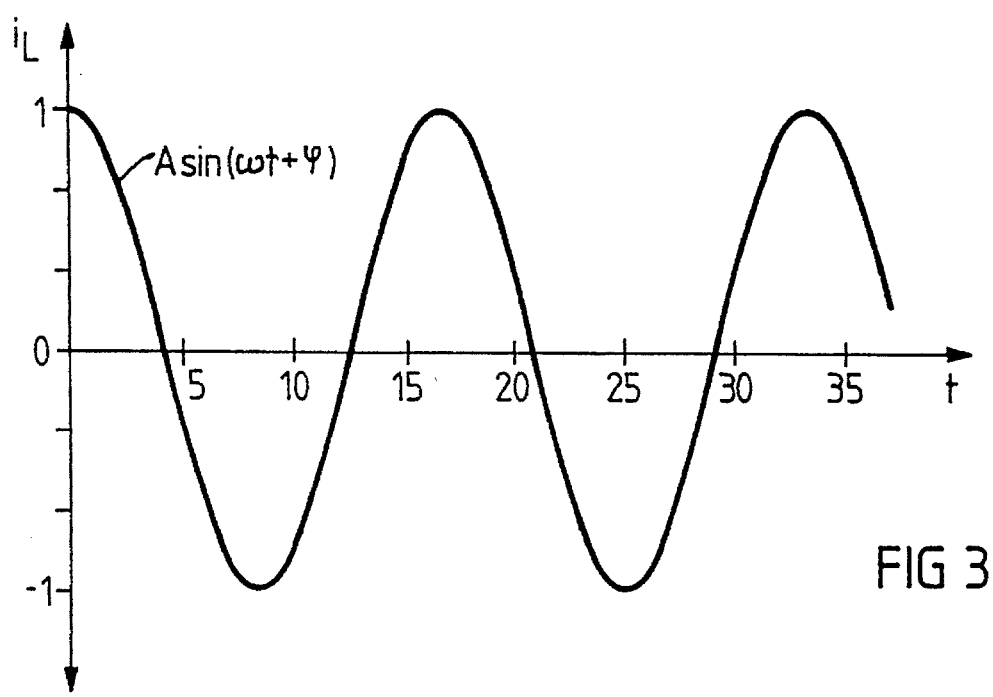
FIG. 3 is a graph of line current plotted as a function of time t.

Referring to FIG. 3, a graph as a function of time t is shown for the change in measured line current $i_L$, which leads the curve for capacitor voltage $u_c$ by 90° of phase. This curve is sinusoidal, and its zero crossings do not shift. This measured line current $i_L$ is transferred to the amplitude input 30 of the synchronizing signal generator 4.

Figure 4:
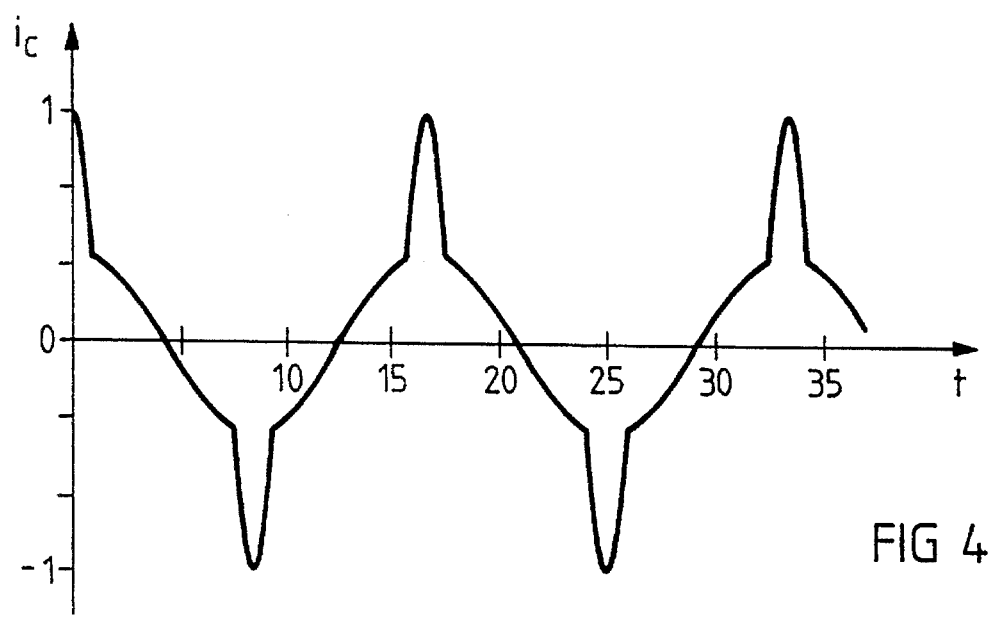
FIG. 4 is a graph of capacitor current plotted as a function of time t.
Figure 5:
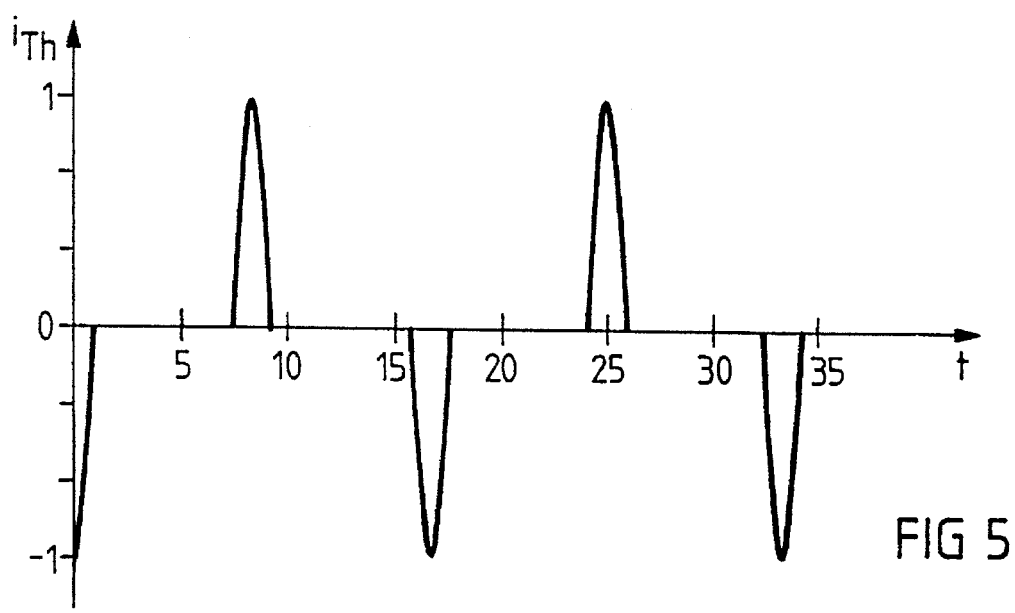
FIG. 5 is a graph in which valve current is plotted, in more detail, as a function of time t.

Referring to FIG. 4, a more detailed graph plotting measured capacitor current $i_c$ against time t is shown, and FIG. 5 shows a more detailed graph of measured valve current $i_{Th}$ as a function of time t. The resulting substitute variable $i_{Thc}$, which is not depicted further, is the sum of capacitor current $i_c$ and valve current $i_{Th}$. This substitute variable $i_{Thc}$ is also sinusoidal, and leads the capacitor voltage $u_c$ by 90° of phase. This substitute variable $i_{Thc}$ can also be transferred, instead of the measured line current $i_L$, to the synchronizing signal generator 4. This is shown in FIG. 1 as a switch 40.

Figure 6:
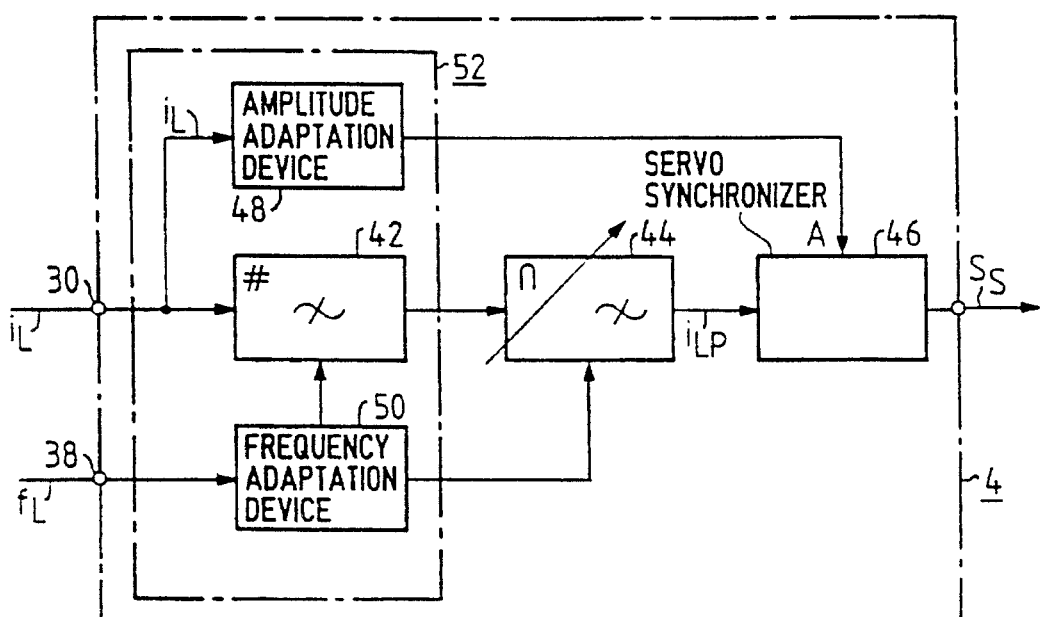
FIG. 6 is a block diagram of the apparatus for generating a synchronizing signal.

Referring to FIG. 6, a block diagram of the synchronizing signal generator 4 is shown. Generator 4 comprises a digital filter 42, an analog filter 44, a servo synchronizer 46, an amplitude adaptation device 48, and a frequency adaptation device 50. The inputs of the digital filter 42 and amplitude adaptation device 48 are coupled to the amplitude input 30 of the generator 4. The output of the digital filter 42 is coupled via the analog filter 44 to a signal input of the servo synchronizer 46. The output of the amplitude adaptation device 48 is coupled to an amplitude input of the servo synchronizer 46. Frequency adaptation device 50 is coupled at the input side to a frequency input 38 of the generator 4, and at the output side to control inputs of filter 42 and filter 44. In a further embodiment of the generator 4, devices 48 and 50 and digital filter 42 are implemented by means of a digital signal processor 52. The analog-digital converter and digital-analog converters that are required for digital/analog processing of an analog signal are not shown specifically in FIG. 6.

Digital filter 42 comprises a bandpass with blocking filter (also called a notch filter), which is required for selective suppression of a specific frequency. The blocking filters used are tuned to the second and third harmonics of system frequency $f_L$, so that these interference effects are attenuated as much as possible. The attenuation depends on the quality of the filter. In addition to attenuation of interference, a phase shift of less than 90° is also produced. Since system frequency $f_L$ can fluctuate within a certain range, the digital filter 42 must be adapted to this fluctuating system frequency $f_L$. Adaptation is provided by changing the sampling time. Device 50 determines the frequency deviation and generates a signal proportional to the frequency, which is transferred to digital filter 42. Analog filter 44, which is provided as a smoothing filter, also receives from device 50 a signal that detunes the filter coefficients. This analog filter 44 also produces a phase shift that is less than 90°. The sum of the phase shifts of digital filter 42 and analog filter 44 is also less than 90°. The configuration of the amplitude adaptation device 48 is shown in greater detail in FIG. 8 as a block diagram.

Figure 7:
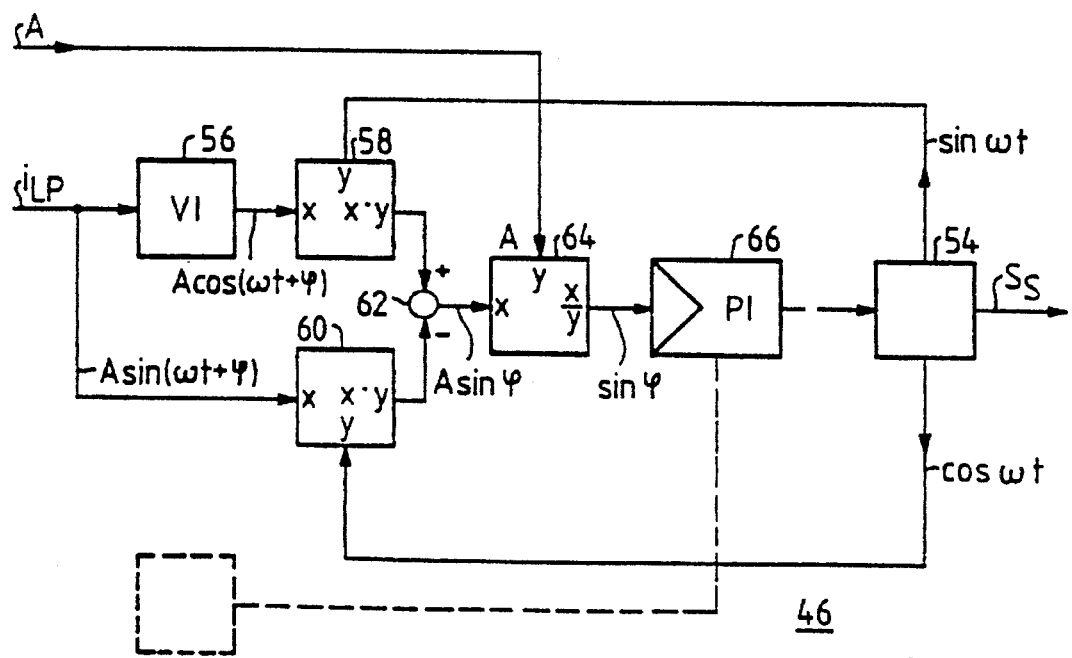
FIG. 7 is a more detailed block diagram of the structure of the servo synchronizer of the apparatus of FIG. 6.

The detailed configuration of servo synchronizer 46 is also shown in FIG. 7 as a block diagram.

The purpose of servo synchronizer 46, also called a phase-locked loop (PLL), is to set the frequency of an oscillator device 54 so that no further phase errors φ occur. Output signal $i_{LP}$ of filter 44 is transferred on the one hand via a vector identifier 56 to a multiplier 58, and on the other hand directly to another multiplier 60. A sine oscillation with frequency omega ωt and amplitude one is conveyed to a second input of multiplier 58 from oscillator device 54, and a cosine oscillation, also with frequency ωt and amplitude one, is conveyed to a second input of multiplier 60 from oscillator device 54. The output of multiplier 58 is coupled to a positive input of a comparator 62, while its negative input is coupled to the output of the second multiplier 60. Downstream from the output of comparator 62 is a divider 64. The output signal A of amplitude adaptation device 48 is supplied to the second input of the divider 64. On the output side, this divider 64 is coupled to a controller 66, especially a proportional-integral controller (PI controller), the output of which is coupled to oscillator device 54. Synchronizing signal $S_S$ is present at the output of oscillator device 54.

Input signal $i_{LP}$ of the servo synchronizer 46 is phase-shifted through 90° by means of vector identifier 56, resulting in a cosine oscillation at the output. A vector identifier 56 of this type is described in the article "Coordinate Transformations for Multi-Variable Control Systems for Three-Phase Power Network Compensation and Symmetrization," by W. Meusel and H. Waldmann, published in the German journal "Siemens Forschungs-und Entwicklungsberichte," vol. 6, 1977, no. 1, pp. 29–38. This cosine oscillation is multiplied by the sine oscillation of oscillation device 54. Multiplier 60 multiplies a sine oscillation by a cosine oscillation. Signal A•sin φ is present at the output of comparator 62. Divider 64 performs amplitude scaling, i.e. output signal A•sin φ of comparator 62 is divided by output signal A of the amplitude adaptation device 48, so that signal sin φ is present at the output of divider 64. Controller 66 downstream regulates this phase shift φ until zero is present at the output of comparator 62.

Figure 8:
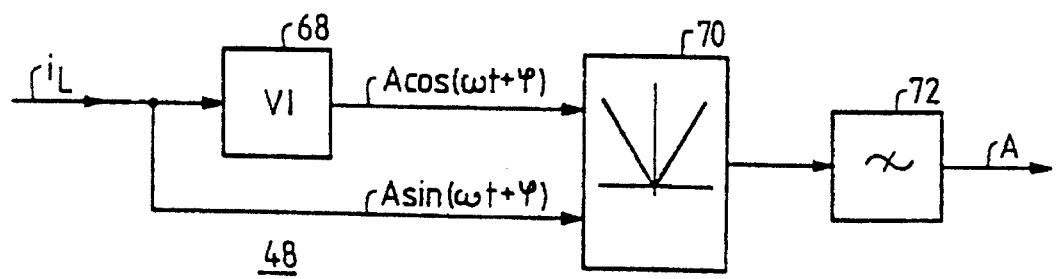
FIG. 8 is a more detailed block diagram of the amplitude adaptation device of FIG. 6.

Referring to FIG. 8, a block diagram for the amplitude adaptation device 48 of FIG. 6 is shown where amplitude A of the measured line current $i_L$ can be calculated. Line current $i_L$ is transferred via a vector identifier 68 to an absolute-value generator 70, and also directly to the absolute-value generator 70. Downstream from the output of absolute-value generator 70 is a smoothing filter 72, which outputs amplitude signal A. Since elements 68, 70, and 72 of device 48 are individually known in the art, and are not further described.

The method and apparatus of the invention generate, from a sinusoidal substitute variable and by means of a simple process that can be performed by a microcomputer, a synchronizing signal $S_S$ synchronized to capacitor voltage $u_c$ of capacitor 14 of a controlled series compensator 2, thereby eliminating the disadvantages of using capacitor voltage $u_c$ as the synchronizing signal $S_S$.

What is claimed:

1. Method for generating a synchronizing signal for a firing-circuit subassembly of a controlled series compensator, comprising:

supplying measured conductor current of a transmission line to a synchronizing signal generator;

generating in said synchronizing signal generator a synchronizing signal;

supplying said synchronizing signal to a firing-circuit subassembly;

generating in said firing-circuit subassembly firing pulses for a power converter valve in a controlled series compensator serially incorporated into said transmission line;

such that said measured conductor current of said transmission line is phase-shifted by 90° from a measured capacitor voltage in said controlled series compensator.

2. The method of claim 1, wherein disturbance signals in said measured conductor current are suppressed before said measured conductor current is phase-shifted by 90°.

3. Method for generating a synchronizing signal for a firing-circuit subassembly of a controlled series compensator, comprising:

supplying measured capacitor current of a controlled series compensator serially incorporated into a transmission line to a logic element;

supplying measured valve current from a power converter valve in said controlled series compensator to said logic element;

combining said measured capacitor current and said measured valve current in said logic element to form a substitute current signal;

supplying said substitute current signal to a synchronizing signal generator;

generating in said synchronizing signal generator a synchronizing signal;

supplying said synchronizing signal to a firing-circuit subassembly;

generating in said firing-circuit subassembly firing pulses for said power converter valve in said controlled series compensator;

such that said substitute current signal is phase-shifted by 90° from a measured capacitor voltage in said controlled series compensator.

4. The method of claim 3, wherein disturbance signals in said substitute current signal are suppressed before said substitute current signal is phase-shifted by 90°.

5. An apparatus for generating a synchronizing signal for a firing-circuit subassembly of a controlled series compensator, comprising:

a controlled series compensator serially integrated into a transmission line, including:
  a capacitor coupled serially within said transmission line, and
  a power converter valve coupled parallel to said capacitor;

a current detection device coupled to said transmission line and measuring a conductor current of said transmission line;

a synchronizing signal generator having a current input and a frequency input and generating a synchronizing signal, said current detection device being coupled to said current input of said synchronizing signal generator and supplying said measured conductor current to said synchronizing signal generator, such that said frequency input of said synchronizing signal generator receives a frequency signal from said transmission line; and a firing-circuit subassembly coupled to said synchronizing signal generator and receiving said synchronizing signal, said firing-circuit subassembly generating firing pulses for said power converter valve in said controlled series compensator, such that said measured conductor current of said transmission line is phase-shifted by 90° from a voltage across said capacitor in said controlled series compensator.

6. The apparatus of claim 5 wherein said synchronizing signal generator comprises a servo synchronizer generating said synchronizing signal.

7. The apparatus of claim 6, wherein said servo synchronizer is implemented as a digital signal processor.

8. The apparatus of claim 6, wherein said servo synchronizer comprises an amplitude input, a current input and a frequency input, said frequency input receiving said frequency signal from said transmission line, said synchronizing signal generator further comprising:

a frequency adaptation device having an input and an output, said frequency signal being supplied to said input of said frequency adaptation device, said frequency adaptation device generating a signal proportional to a frequency of said frequency signal;

a digital filter having a current input, a frequency input, and an output, said conductor current being supplied to the current input of said digital filter, said proportional signal of said frequency adaptation device being supplied to said frequency input of said digital filter, said digital filter modifying said conductor current by removing higher harmonics of said conductor current based on said proportional frequency signal;

an analog filter having a current input, a frequency input, and an output, said proportional frequency signal of said frequency adaptation device being supplied to said frequency input of said analog filter, said modified conductor current being supplied to said current input of said analog filter, said analog filter smoothing said modified conductor current based on said proportional frequency signal, said analog filter supplying said smoothed, modified current signal to said current input of said servo synchronizer; and an amplitude adaptation device having a current input and an output, said conductor current signal being supplied to said current input of said amplitude adaptation device, said amplitude adaptation device generating a signal proportional to an amplitude of said conductor current and supplying said proportional amplitude signal to the amplitude input of said servo synchronizer;

such that said servo synchronizer generates synchronizing signals for said firing-circuit subassembly to reduce phase errors in said conductor current in dependence on said smoothed, modified current signal from said analog filter and said proportional amplitude signal and said frequency signal.

9. The apparatus of claim 8 wherein said amplitude adaptation device, said frequency adaptation device, and said digital filter are implemented as a digital signal processor.

10. An apparatus for generating a synchronizing signal for a firing-circuit subassembly of a controlled series compensator, comprising:

a controlled series compensator serially integrated into a transmission line, including:
  a capacitor coupled serially within said transmission line, and
  a series connection comprising a power converter valve coupled in series to a coil, said series connection coupled in parallel to said capacitor;

a first current detection device coupled to said transmission line and measuring a capacitor current through said capacitor serially coupled within said transmission line;

a second current detection device coupled to said power converter valve and measuring a valve current through said power converter valve;

a logic element having first and second inputs and an output, said first input of said logic element receiving said capacitor current from said first current detection device and said second input of said logic element receiving said valve current from said second current detection device, such that said logic element combines said capacitor current and said valve current to form a substitute current signal supplied to said output of said logic element;

a synchronizing signal generator having a current input and a frequency input and generating a synchronizing signal, said logic element being coupled to said synchronizing signal generator such that said substitute current signal is supplied to said current input of said synchronizing signal generator, such that said frequency input of said synchronizing signal generator receives a frequency signal from said transmission line; and a firing-circuit subassembly coupled to said synchronizing signal generator and receiving said synchronizing signal, said firing-circuit subassembly generating firing pulses for said power converter valve in said controlled series compensator, such that said substitute current signal is phase-shifted by 90° from a voltage across said capacitor in said controlled series compensator.

11. The apparatus of claim 10 wherein said synchronizing signal generator comprises a servo synchronizer generating said synchronizing signal.

12. The apparatus of claim 11, wherein said servo synchronizer is implemented as a digital signal processor.

13. The apparatus of claim 11, wherein said servo synchronizer comprises an amplitude input, a current input and a frequency input, said frequency input receiving said frequency signal from said transmission line, said synchronizing signal generator further comprising:

- a frequency adaptation device having an input and an output, said frequency signal being supplied to said input of said frequency adaptation device, said frequency adaptation device generating a signal proportional to a frequency of said frequency signal;

- a digital filter having a current input, a frequency input, and an output, said conductor current being supplied to the current input of said digital filter, said proportional frequency signal of said frequency adaptation device being supplied to said frequency input of said digital filter, said digital filter modifying said conductor current by removing higher harmonics of said conductor current based on said proportional frequency signal;

- an analog filter having a current input, a frequency input, and an output, said proportional signal of said frequency adaptation device being supplied to said frequency input of said analog filter, said modified conductor current being supplied to said current input of said analog filter, said analog filter smoothing said modified conductor current based on said proportional frequency signal, said analog filter supplying said smoothed, modified current signal to said current input of said servo synchronizer; and

- an amplitude adaptation device having a current input and an output, said conductor current signal being supplied to said current input of said amplitude adaptation device, said amplitude adaptation device generating a signal proportional to an amplitude of said conductor current and supplying said proportional amplitude signal to the amplitude input of said servo synchronizer;

- such that said servo synchronizer generates synchronizing signals for said firing-circuit subassembly to reduce phase errors in said conductor current in dependence on said smoothed, modified current signal from said analog filter and said proportional amplitude signal and said frequency signal.

14. The apparatus of claim 13 wherein said amplitude adaptation device, said frequency adaptation device, and said digital filter are implemented as a digital signal processor.

* * * * *